United States Patent
Ritter et al.

(10) Patent No.: US 12,360,128 B2
(45) Date of Patent: Jul. 15, 2025

(54) METHOD AND DEVICE FOR SOFTWARE-BASED PLANNING OF A DIMENSIONAL MEASUREMENT

(71) Applicant: Carl Zeiss Industrielle Messtechnik GmbH, Oberkochen (DE)

(72) Inventors: Markus Ritter, Heidenheim (DE); Steffen Hersacher, Westhausen (DE); Kilian Neumaier, Heidenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 291 days.

(21) Appl. No.: 17/175,692

(22) Filed: Feb. 14, 2021

(65) Prior Publication Data

US 2021/0263057 A1 Aug. 26, 2021

(30) Foreign Application Priority Data

Feb. 14, 2020 (EP) .................... 20157297

(51) Int. Cl.
*G01N 35/00* (2006.01)
*G01B 21/04* (2006.01)

(52) U.S. Cl.
CPC . *G01N 35/00693* (2013.01); *G01N 35/00722* (2013.01); *G01N 2035/00702* (2013.01); *G01N 2035/0091* (2013.01)

(58) Field of Classification Search
CPC ... G01N 35/00693; G01N 2035/00702; G01N 2035/0091; G01B 21/06; G01B 21/10; G01B 21/20; G01B 21/22
USPC ....................................................... 702/127
See application file for complete search history.

(56) References Cited

U.S. PATENT DOCUMENTS

| 2017/0090742 A1 | 3/2017 | Ade et al. |
| 2018/0010910 A1 | 1/2018 | Dotschkal et al. |
| 2018/0189610 A1 * | 7/2018 | Kandemir ......... G06F 18/24155 |

(Continued)

FOREIGN PATENT DOCUMENTS

| EP | 3865979 A1 * | 8/2021 | ....... G01N 35/00693 |
| JP | 2006065582 A | 3/2006 | |

OTHER PUBLICATIONS

Industrielle Messtechnik von Carl Zeiss, "Calypso. Einfach programmieren", created Jul. 2, 2013, pp. 1-16.

(Continued)

*Primary Examiner* — Michael P Nghiem
(74) *Attorney, Agent, or Firm* — Miller Johnson (57) ABSTRACT

A method for software-based planning of a dimensional measurement of a measurement object includes receiving an input command for selecting at least one measurement element of the measurement object that is to be measured during the measurement. The method includes determining a selection of measurable test features of the at least one selected measurement element. Each of the test features includes a dimensionally measurable measurand of the at least one selected measurement element. The method includes determining a reduced subset of the selection of measurable test features depending on a view currently chosen on a display. The method includes visualizing the test features contained in the reduced subset by generating a graphical representation of each of the test features contained in the reduced subset on the display.

10 Claims, 3 Drawing Sheets

(56) References Cited

U.S. PATENT DOCUMENTS

| | | | |
|---|---|---|---|
| 2021/0263057 A1* | 8/2021 | Ritter | G01B 5/008 |
| 2021/0278206 A1* | 9/2021 | Ritter | G01B 21/20 |

OTHER PUBLICATIONS

Carl Zeiss, "Einfach Messen Und was Sie dazu wissen sollten Eine Fibel der Messtechnik", Apr. 1999, pp. 1-120.

\* cited by examiner

METHOD AND DEVICE FOR SOFTWARE-BASED PLANNING OF A DIMENSIONAL MEASUREMENT

CROSS-REFERENCE TO RELATED APPLICATIONS

This application claims priority to European Application No. 20 157 297.1 filed Feb. 14, 2020. The entire disclosure of the application referenced above is incorporated by reference.

FIELD

This disclosure relates to a method and a device for assisting software-based planning of a dimensional measurement of a measurement object. Furthermore, the disclosure relates to a computer program product with the aid of which the herein presented method is able to be carried out on a computer.

BACKGROUND

The presented method and the device are particularly intended to assist the user of a dimensional measuring apparatus to plan in advance a measurement carried out on a measurement object. Such planning is normally effected in a software-based manner in practice.

Dimensional measuring apparatuses for which such software-based planning of the measurement sequence is often used are coordinate measuring machines or microscopes, for example. Roughness measuring apparatuses or other measuring apparatuses for measuring distances and/or surface properties of a measurement object are likewise understood as dimensional measuring apparatuses in the present sense.

Coordinate measuring machines having tactile and/or optical measuring sensors are used in dimensional metrology in order to ascertain the shape of a workpiece surface by scanning, for example. Since dimensional metrology generally finds application in branches of industry in which very high accuracies are required, for example for subsequent processing steps or for quality assurance, error-free implementation of measurements is of immense importance.

Microscopes—for example, scanning electron microscopes (SEMs) or atomic force microscopes (AFMs)—are used to view or to represent as an image for example the surface of a workpiece in the course of quality control under high magnification. In this case, the surfaces observed have structures whose order of magnitude is below the resolving power of a human eye, in some instances even at the atomic level. Microscopic measuring apparatuses are preferably used in the fields of biology, medicine and materials sciences.

On account of the high accuracy requirements made of the dimensional measuring apparatuses mentioned above, it is desirable to ensure a measurement sequence that is as far as possible automated and consistent, such that for example a multiplicity of measurement objects can be measured as rapidly and reproducibly as possible. During such a measurement sequence, a measuring head of the measuring apparatus is preferably moved along a predefined measurement path that was planned beforehand by a software application depending on the object to be measured. The measurement path is stored together with diverse measurement and machine parameters in a plan, which is typically referred to as a measurement plan or test plan. The creation of such an automated measurement sequence and thus the creation of the measurement plan requires knowledge about the functioning of measuring apparatuses and experience as to how different measurement objects should best be measured.

By way of example, under the designation CALYPSO, Carl Zeiss Industrielle Messtechnik GmbH offers software for creating such measurement sequences and for processing the measurement results obtained. The basic principles of CALYPSO are described for example in a brochure entitled "Einfach Messung und was Sie dazu wissen sollten-Eine Fibel der Messtechnik" ["Straightforward measurement and what you should know to implement it-Primer for metrology"] (order number from Carl Zeiss: 61212-2400101) or in an advertising brochure from Carl Zeiss Industrielle Messtechnik GmbH entitled "CALYPSO. Einfach programmieren" ["CALYPSO. Simple programming"] (publication number 60-11-068).

The measurement sequence is created by CALYPSO software on the basis of so-called test features. A test feature represents a dimensional property of one or more geometric elements (so-called measurement elements) on a measurement object.

Example measurement elements are a drilled hole in the measurement object, a cylinder section on the measurement object, an edge of the measurement object, an outer or inner surface of the measurement object or a characteristic point on the surface of the measurement object, etc.

Example test features are the diameter of a drilled hole, the circularity of a cylinder section, a spatial distance between two geometric elements (points, edges or lines or areas).

In order to quantify a test feature of a measurement element, generally a plurality of measurement points on the measurement element of the measurement object have to be detected and moved to by the measuring head.

In order to create the measurement sequence, the user firstly defines the measurement elements to be measured on the measurement object. In this case, the user defines in the software, on the basis of a CAD model of the measurement object, for example, what geometric elements (measurement elements) of the measurement object are intended to be measured. The user chooses the individual measurement elements to be measured with the aid of a cursor, for example, and selects them by clicking or double clicking using the mouse, for example. In addition to the measurement elements to be measured, the user also has to define the test features of the individual measurement elements, i.e. the user has to define what properties of these selected geometric elements are intended to be measured. The user likewise has to define the measurement order and various further measurement parameters, for example the parameters for later machine movement. This parameter inputting has to be done by an experienced user in order to adapt the measurement sequence for example to specific measurement conditions (e.g. a movement speed or tolerance). The parameter inputting and adapting requires a high expenditure of time since a large number of parameters have to be input manually for each measurement element. Moreover, the manual parameter inputting requires a high degree of expert knowledge, which results in high costs for creating measurement sequences.

In order to simplify this software-based planning of the measurement sequence for the user, conventional software applications normally assist the user as follows in defining the test features to be measured: As soon as the software receives an input command for selecting one or more measurement elements (for example by the user selecting one or more measurement elements using his/her mouse), the software determines a selection of fundamentally possible, measurable test features which match the selected measurement element. This determination is typically effected depending on the type of selected measurement element or selected measurement elements and is typically predefined in the software for each type of measurement element. By way of example, any possible measurands which are measurable with regard to a drilled hole and might be of interest are stored as measurable test features of the measurement element "drilled hole" in a database. As soon as the user thus selects a drilled hole as measurement element to be measured on the CAD model of the measurement object, the software determines this selection of measurable test features by calling up the corresponding stored entries and visualizes on a display all test features that are fundamentally measurable with respect to the drilled hole selected. This is typically done by visualizing graphical representations of the individual test features on the display. Each fundamentally possible test feature of the selected measurement element is displayed on the display typically by way of a corresponding graphical representation. Such a graphical representation may be for example a dimensioning element comprising a dimension line, a dimension arrow, a dimension symbol and/or a dimension text. Then, for example by clicking on a graphical representation of a test feature, the user can select the desired test feature and define and store it in the measurement plan as the test feature to be tested for the respective measurement element (so-called Click & Pick selection).

What is problematic here is the following: There typically exists a multiplicity of fundamentally possible test features which are fundamentally measurable on or for a measurement element. In the case of the procedure mentioned above in the software applications known hitherto this has the effect that many different graphical representations of possible test features are displayed simultaneously on the display when the user selects a measurement element. If the user selects a test feature, then very many possibilities for corresponding test features are thus proposed for the user at the same time. The number of test features proposed by the software and thus the number of graphical representations of the proposed test features that are displayed on the display typically increase when a plurality of measurement elements are selected simultaneously.

In such situations it is only with great difficulty that a user can select the test features that he/she actually wants. The possibilities displayed to the user are unclear on account of the multiplicity of graphical representations displayed on the display. This makes the process of planning the measurement sequence more difficult and ultimately costs the user of the software more time.

It is true that the CALYPSO software mentioned in the introduction affords the possibility of the user of the software making a static preselection of the possible test features displayed to him/her, to provide clarity. By way of example, by means of preselection the user can stipulate beforehand that when a measurement element of a specific type is selected, only a specific number of test features specifically defined by the user are proposed for the user and displayed on the display. However, even this measure results in a simplification of handling for the user of the software only in a limited way. Depending on the application and the type of measurement object, it may indeed be necessary to alter the preselection of the test feature proposals displayed on the display. In order to influence this preselection, e.g. in order that when a certain measurement element is selected, the software proposes a different type of test feature, a manual intervention by the user is necessary.

SUMMARY

It is an object to provide a method and a device that overcome the disadvantages mentioned above. In particular, it is an object to improve a method and a device for assisting the software-based planning of a dimensional measurement of a measurement object in such a way that the selection of the test features which are intended to be adopted in the measurement plan is simplified for the user of the method and the device.

According to a first aspect, a method is presented that comprises the following steps:
receiving an input command for selecting at least one measurement element of the measurement object that is to be measured during the measurement;
determining a selection of measurable test features of the at least one selected measurement element, wherein each of the test features comprises a dimensionally measurable measurand of the at least one selected measurement element;
determining a reduced subset of the selection of measurable test features depending on a view currently chosen on a display; and
visualizing the test features contained in the reduced subset by means of a graphical representation of each of the test features contained in the reduced subset on the display.

According to a further aspect, a device is presented that comprises a display and a control unit, wherein the control unit is connected to the display via a data connection and configured:
to receive an input command for selecting at least one measurement element of the measurement object that is to be measured during the measurement;
to determine a selection of measurable test features of the at least one selected measurement element, wherein each of the test features comprises a dimensionally measurable measurand of the at least one selected measurement element;
to determine a reduced subset of the selection of measurable test features depending on a view currently chosen on a display; and
to visualize the test features contained in the reduced subset by means of a graphical representation of each of the test features contained in the reduced subset on the display.

In accordance with a further aspect, a computer program product is presented that comprises program code configured to carry out the method mentioned above when the program code is executed on a computer.

According to the herein presented method and device, after at least one measurement element has been selected, not all of the test features that would be fundamentally measurable for the at least one selected measurement element (selection of measurable test features) are proposed for the user. Instead, only a reduced subset of this selection of fundamentally measurable test features is displayed graphically to the user on the display, from which reduced subset the user can then select one or more test features that is/are intended to be included in the measurement plan. This reduced subset of test features is determined on the basis of the view currently chosen by the user on the display. Consequently by way of example, only the graphical representations of the fundamentally possible test features of a selected measurement element which are readily visible in the view currently chosen on the display are thus visualized on the display. Test features whose graphical representation would be less readily visible in the view currently chosen on the display, for example because they would be concealed by the graphical representations of other test features, would be too small in the view currently chosen or would be only partly visible or not visible at all in the view currently chosen, are not assigned to the reduced subset and thus not visualized on the display either.

This provides for significantly better clarity for the user since only the test features which are actually able to be represented well in the view currently chosen are graphically visualized on the display for the user. Thus, in a significantly more intelligent manner than hitherto, proposals are made to the user for test features which the user can then select and adopt in the measurement plan for example by means of clicking on the graphical representation thereof on the display. This distinctly simplifies handling for the user, such that the latter can create a measurement plan for the dimensional measurement of a measurement object significantly more simply and more rapidly.

The present disclosure is based on the concept, inter alia, that by virtue of the view chosen by the user on the display, the user already intuitively himself/herself makes a selection of test features that might be of interest to the user. This follows from the assumption that the user, when selecting a measurement element on the display, will always choose that view of the measurement object in which the test feature currently sought by the user or its graphical representation actually exhibits the best possible clarity on the display.

If the user is interested for example in including the diameter of a drilled hole as a test feature in the measurement plan, then the user, before selecting the drilled hole as a measurement element to be measured during the measurement by way of an input command, will choose on the display a view in which the drilled hole, and in particular the diameter thereof, is visible as well as possible. In such a case the user will not, for example, choose on the display a view in which the diameter of the drilled hole would be only partly representable or visible only very poorly for other reasons.

According to a refinement, the method furthermore comprises the following steps:
  receiving a second input command for selecting a test feature visualized on the display; and
  storing the selected test feature in a measurement plan, in which the test features to be measured during the dimensional measurement of the measurement object are stored.

Thus, preferably by means of Click & Pick selection, the user can select, from the reduced subset of test features or the graphical representations thereof displayed to the user on the display, one or more thereof, which are then stored in the measurement plan. The user thus requires only very few steps to select a test feature for the measurement plan. The user merely has to choose a corresponding view on the display in which that part of the measurement object which is currently of interest to the user is readily visible; the user then has to select at least one measurement element to be measured on the measurement object by way of an input command; and ultimately to select a test feature that is visualized on the display by way of a second input command, the test feature then being adopted in the measurement plan.

In a refinement, the reduced subset of the test features whose graphical representations are visualized on the display is determined again as soon as the view on the display is changed.

The determination of the reduced subset of the test feature proposals to be visualized on the display is thus determined dynamically depending on the view chosen by the user on the display. As soon as the user changes this view on the display, for example by virtually rotating the measurement object or zooming in or zooming out of the current view, the test feature proposals acquired by the user by way of the graphical representations of the test features displayed on the display are correspondingly adapted automatically as well. In this way, the user permanently acquires a very clear representation in which only few test features that might be expedient on the basis of the view currently chosen are proposed by way of their corresponding representation.

In a refinement, determining the reduced subset of test features involves determining what positions, spatial locations and/or sizes the respective graphical representations of the test features contained in the selection would have in the view currently chosen on the display if the graphical representations were displayed on the display, wherein a test feature contained in the selection is assigned to the reduced subset only if the graphical representation of the test feature satisfies at least one predefined criterion with regard to the position, the spatial location and/or the size in the view currently chosen on the display.

When at least one measurement element is selected, therefore, initially a selection of fundamentally measurable test features is thus determined as usual. This selection of measurable test features of the at least one selected measurement element is preferably determined depending on the type of the at least one selected measurement element. The selection of the fundamentally measurable test features thus contains only the test features which might generally be of interest with regard to the at least one measurement element selected by the user. If the user selects two points on the measurement object, for example, then the initially determined selection of fundamentally measurable test features contains for example a distance between the two points or the respective distance between the two points and an origin of a coordinate system. In the event of two points being selected that are selected as measurement elements by the user, the initially determined selection of fundamentally measurable test features will not contain a diameter, radius or angle since such test features would not make sense anyway in the event of two points being selected.

The reduced subset of test features is then determined from this (pre) selection of measurable test features that are generally possible, wherein a test feature contained in the (pre) selection is assigned to the reduced subset only if the graphical representation of the test feature has a certain position, location and/or size in the view currently chosen on the display. Otherwise, the corresponding test feature is not assigned to the reduced subset and thus not visualized on the display either. It is then not available at all to the user for selection and adoption in the measurement plan.

In a refinement, the at least one predefined criterion according to which a test feature contained in the initially determined selection of generally measurable test features is adopted in the reduced subset of test features comprises the fact that the graphical representation of the respective test feature, in particular a longitudinal direction of the graphical representation of the respective test feature, in the view currently chosen on the display, exceeds a predefined angle in relation to a normal vector oriented orthogonally to an image plane of the display.

Accordingly, a test feature is assigned to the reduced subset only if its graphical representation is oriented at a predefined minimum angle with respect to the viewing direction of the user, wherein the viewing direction is assumed to be orthogonal (normal direction) to the image plane currently chosen on the display. Test features whose graphical representation would be displayed for example parallel to the current viewing direction or would have only a very small angle in relation to the normal direction with respect to the image plane of the display are not assigned to the reduced subset and thus not displayed on the display. In the case of the latter it is assumed that their graphical representations, in the view currently chosen on the display, would be visible only poorly anyway for the user. By contrast, test features whose graphical representations lie exactly in the image plane of the display, that is to say are oriented transversely or orthogonally to the normal direction with respect to the image plane, are assigned to the reduced subset and displayed on the display since they are visible very well in the view currently chosen.

It goes without saying that the term "image plane" is understood to mean a two-dimensional plane corresponding to the surface of a flat, two-dimensional display, for example. The normal direction mentioned runs orthogonally to the image plane.

In a further refinement, the at least one predefined criterion according to which the test features are assigned to the reduced subset comprises the fact that the graphical representation of the respective test feature is completely representable in the view currently chosen on the display.

Accordingly, a test feature is assigned to the reduced subset and visualized on the display only if its graphical representation is completely representable on the display in the view currently chosen. By contrast, if only a part of the graphical representation of the test feature falls within the region of the view currently chosen on the display, then the corresponding test feature would not be represented on the display.

This may be the case for example if the user chooses on the display a magnified view in which only a detail of a drilled hole, but not the entire drilled hole, is visible. In such a case, it is assumed that the user is not interested in the diameter as test feature of the drilled hole, but rather for example only in the circularity of the currently visible part of the inner surface of the drilled hole.

In a further refinement, the at least one predefined criterion comprises the fact that the graphical representation of the respective test feature exceeds a predefined size in the view currently chosen on the display.

If the graphical representation of a possible test feature would be represented too small in the view currently chosen, since the corresponding detail occupies only a very small segment of the view currently chosen on the display, then this test feature is not assigned to the reduced subset and thus not even displayed on the display in the first place. Here, too, it is again assumed that the user, when selecting a measurement element, chooses a view on the display in which the test feature of the measurement element that is currently sought by the user is able to be represented large enough.

If the user would like to define the diameter of a drilled hole of the measurement object as the test feature, for example, then the user will not choose any view of the measurement object in which the corresponding drilled hole is represented only very small. If the user clicks on this drilled hole despite the fact that it is represented very small on the display, then this might indicate that the user is interested in the distance between the center axis of the drilled hole and the origin of the coordinate system as the test feature if the origin of the coordinate system is positioned somewhat further away from the drilled hole. Specifically, in this case, the distance could be displayed by way of an arrow that would be able to be represented relatively large in the view currently chosen on the display.

It goes without saying that the at least one predefined criterion used for the assignment of the test features to the reduced subset can comprise not just one of the alternatives mentioned above but also an arbitrary combination of the alternatives mentioned above or all of the alternatives mentioned above as conditions.

The abovementioned graphical representations of the test features include for example dimensioning elements, such as a dimension line, a dimensioning error, a dimension symbol and/or a dimension text. To put it another way, the test features are preferably represented graphically in the form of a dimension line, a dimension arrow, a dimension symbol and/or a dimension text on the display. Preferably, each test feature has a predefined type of graphical representation. By contrast, the size of the graphical representation is dependent on the view currently chosen on the display.

By way of example, the distance between two points is in principle represented graphically by a double-headed arrow between the two points. The size of the double-headed arrow and also the spatial location and/or orientation of the double-headed arrow vary by their nature, however, depending on the view chosen on the display.

Example test features are: A spatial distance between two points, a spatial distance between two straight lines/edges, a spatial distance between two planes, a spatial distance between a point and a straight line or a plane, a spatial distance between a straight line and a plane, a spatial distance between a plane, a straight line or a point and an origin of a coordinate system, a projection of a spatial distance onto a coordinate axis, a spatial angle, a projection of a spatial angle into a coordinate plane, a parallelism of two straight lines or planes, a perpendicularity of two straight lines or planes, a shape deviation of a circle, of a circle segment, of a straight line, of a rectangle, of an elongated hole or of a plane, a diameter or a radius of a circle or of a circle segment, a curve length, a curve shape, a circularity of a circle or of a circle segment, a straightness of a straight line, a planarity of a plane and/or a roughness of a surface.

It goes without saying that the features mentioned above and those yet to be explained below can be used not only in the combination respectively indicated, but also in other combinations or by themselves, without departing from the spirit and scope of the present disclosure.

Moreover, it goes without saying that the features mentioned above and those yet to be explained below relate not only to the presented method but equivalently to the presented device and to the computer program product.

DETAILED DESCRIPTION

Figure 1:
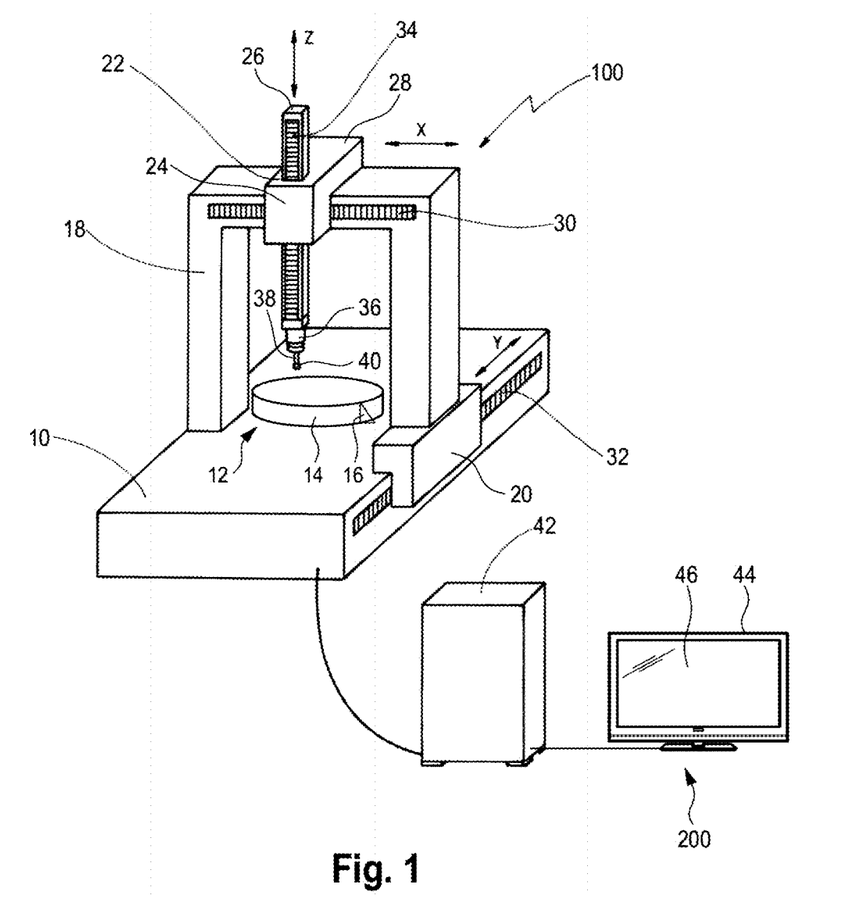
FIG. 1 is a functional block diagram of a measuring apparatus according to the principles of the present disclosure.

FIG. 1 shows an example measuring apparatus with one example embodiment of a device, on which the presented method may be carried out. The measuring apparatus is designated in its entirety by the reference numeral 100. The device is identified in its entirety by the reference numeral 200.

In the present example, the measuring apparatus is a coordinate measuring machine of so-called gantry design. In other example embodiments, the measuring apparatus can also be a microscope, for example a scanning electron microscope or an atomic force microscope. The measuring apparatus can also be other types of coordinate measuring machines or in principle other types of measuring apparatuses for dimensional measurement.

The coordinate measuring machine 100 shown in FIG. 1 includes a base 10. The base 10 is preferably a stable plate, which is produced from granite, for example. A workpiece receptacle 12 embodied to hold or receive a measurement object 14 is arranged on the base 10. For this purpose, for example one or more securing elements 16 (e.g. clamping means or (screw) clamps) are provided on the workpiece receptacle 12, by means of which securing elements the measurement object 14 is secured to the workpiece receptacle 12 preferably in a releasable fashion. The measurement object 14 can be an arbitrary measurement object that is intended to be measured by the coordinate measuring machine 100.

A gantry 18 is arranged on the base 10 such that it is displaceable in the longitudinal direction. The gantry 18 serves as a movable carrier structure. The gantry 18 has two columns projecting upward from the base 10, which are connected to one another by a crossbeam and have an inverted U-shape overall.

The direction of movement of the gantry 18 in relation to the base 10 is usually referred to as the Y-direction and is implemented by way of a first motor drive 20 (e.g., a servomotor). The first drive 20 is arranged in an end region—facing the base 10—of one of the projecting columns and is configured to move the gantry 18 along the Y-direction. A slide 22, which is movable in the transverse direction by way of a second motor drive 24, is arranged on the upper crossbeam of the gantry 18. This transverse direction is usually referred to as the X-direction. In the present case, the second drive 24 is installed in the slide 22. The slide 22 carries a sleeve 26, which is movable in the Z-direction, i.e., perpendicularly to the base 10, by way of a third motor drive 28. The third drive 28 is integrated in the slide 22. It should be mentioned that the drives 20, 24, 28 need not be arranged at the positions mentioned. By way of example, the third drive 28 can be installed in the sleeve 26.

Measuring devices on the basis of which the X-, Y- and Z-positions of the gantry 18, the slide 22 and the sleeve 26 can be determined are denoted by the reference numerals 30, 32, 34. The measuring devices 30, 32, 34 are typically glass rulers, which serve as measuring scales. These measuring scales are formed in conjunction with corresponding reading heads (not shown here) to determine the respectively current position of the gantry 18 in relation to the base 10, the position of the slide 22 in relation to the upper crossbeam of the gantry 18 and the position of the sleeve 26 in relation to the slide 22.

A measuring head 36 is arranged at a lower, free end of the sleeve 26. The measuring head 36 is configured to detect measurement points on the measurement object 14. The measuring head 36 is part of a measuring sensor, the measuring sensor system of which can be arranged separately from the measuring head 36 or can be integrated in the latter and can be connected thereto by way of one or more cables or in wireless fashion. The measuring head 36 has a tactile stylus 38, which projects in the Z-direction in the direction of the base. The stylus 38 is configured to probe a surface of the measurement object 14 by means of a probe head 40. By way of example, the probe head 40 is a ruby sphere.

When scanning the surface of the measurement object 14, the probe head 40, in the measuring head 36, generates an electrical measurement signal, on the basis of which it is possible to ascertain the dimensional properties of the measurement object 14 to be measured. In order to move to the measurement points on the measurement object 14, the measuring head 36 is moved relative to the workpiece receptacle 12 or to the measurement object 14 by means of the drives 20, 24, 28. For this purpose, the drives 20, 24, 28 receive control commands from a control unit 42, on the basis of which the drives 20, 24, 28 are controlled, in each case individually or all together (for example, by way of CNC control).

In FIG. 1 the control unit 42 is arranged as a separate unit at a distance from the coordinate measuring machine 100 and is connected to the base 10 of the coordinate measuring machine via a plurality of cables. A wireless connection is likewise possible. Moreover, it is possible for the control unit 42 to be integrated in the coordinate measuring machine 100 (e.g. in the base 10).

The control unit 42 should furthermore also be regarded as part of the device 200. The device 200 serves not only for controlling the coordinate measuring machine 100 but also, in advance of the measurement, for assisting software-based planning of the measurement of the measurement object 14. Specifically, before such a measurement can begin, the measurement sequence is typically defined in a measurement plan in a software-based manner. This involves defining, in particular, what geometric elements (measurement elements) of the measurement object 14 are intended to be measured and what dimensional measurands (test features) of the measurement elements are intended to be detected quantitatively by the coordinate measuring machine 100. Furthermore, diverse parameters concerning the measurement strategy, measurement speed and concerning the control of the coordinate measuring machine 100 and in particular of the measuring head 36 are defined in the test plan.

The device 200 is configured as a computer 44 in the present case. The computer 44 comprises a display 46 besides the control unit 42, which is typically configured as a computing unit of the computer. The control unit 42 preferably comprises a processor and a storage device (e.g. a hard disk). Program code of a software application that is executable with the aid of the processor of the control unit 42 is stored in the storage device.

One example software application is the CALYPSO software sold by the applicant. CALYPSO is software for planning measurement paths and for evaluating measurement points that is preferably designed to carry out the presented method for assisting the software-based planning of the dimensional measurement of the measurement object 14. By means of CALYPSO a user creates a measurement plan, for example, on the basis of which the measurement object 14 is intended to be measured.

In order to produce the measurement plan, which is often also referred to as a test plan, in a first step the user firstly defines at least one measurement element of the measurement object 14 that is to be measured during the subsequent measurement. For this purpose, a two-dimensional or three-dimensional, virtual view (scene) of a measurement space is provided for the user for example on the display 46 of the computer 44. In the virtual measurement space scene, preferably, the measurement object 14 is displayed to the user in the form of a two-dimensional or three-dimensional model (e.g. CAD model), from which the user can select one or more geometric elements as measurement elements to be measured (see step S101 in FIG. 2).

In order to select a measurement element desired by the user, which may be for example an edge, a point, an area or a drilled hole, the user, preferably with the aid of a mouse, clicks on the corresponding measurement element or the virtual graphical representation thereof on the display 46.

Figure 2:
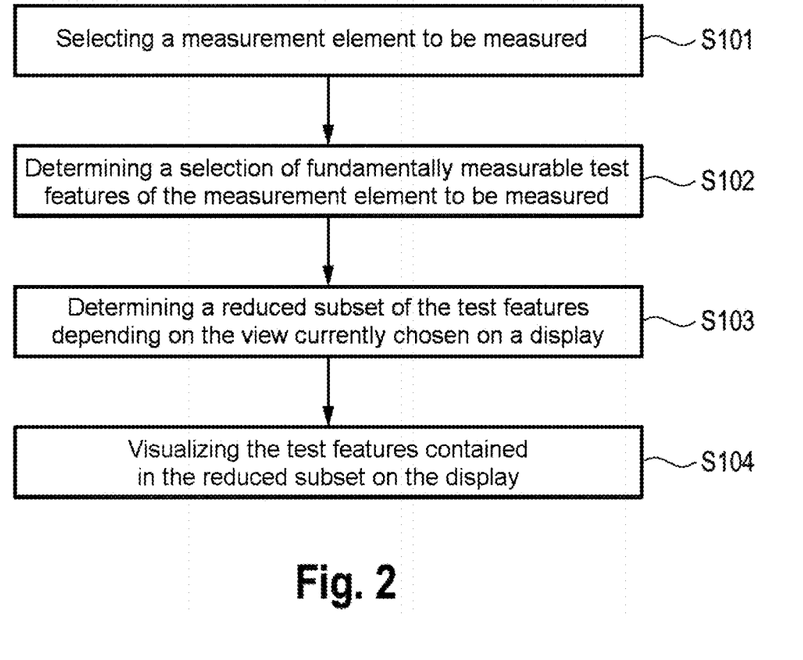
FIG. 2 is a flowchart of an example embodiment of the presented method.

It goes without saying that the input command for selecting the measurement element to be measured in accordance with step S101 can also be effected with the aid of some other input device and does not necessarily have to be effected with the aid of a mouse.

In the next step S102, the control unit 42 then determines a selection of measurable test features that are appropriate for the measurement element selected by the user. Preferably, only test features which make sense for the selected measurement element are determined on the part of the control unit 42 in this step. If the user selects an edge as measurement element, then a diameter would not make very much sense as a test feature of this measurement element and, consequently, in this case, would not be assigned to the selection of fundamentally measurable test features of the selected measurement element.

The determination of the selection of fundamentally measurable test features in step S102 is preferably effected on the basis of the type of measurement element selected by the user. Preferably, a storage device is provided in the control unit 42 for this purpose, in which storage device every type of measurement element is assigned a list or selection of fundamentally possible and expediently measurable test features. The control unit 42 preferably accesses this assignment list or assignment table in step S102.

The selection of fundamentally measurable test features that is determined in step S102 is reduced to a selection of fewer test features in the subsequent step S103. This reduced subset of the test features that is determined in step S103 accordingly contains fewer test features than the selection-initially determined in step S102—of test features that would be fundamentally measurable with regard to the selected measurement element.

The reduction of the test features to the subset mentioned, as effected in step 103, substantially serves the purpose of proposing only a smallest possible selection of test features to the user in order to be able to maintain clarity for the user. Preferably, only the test features in which the user in all probability is interested are intended to be proposed to the user for selection.

The reduction to the subset mentioned is effected depending on the view currently chosen by the user on the display 46. The test features contained in the reduced subset are proposed to the user by way of graphical visualization of the test features (step S104 in FIG. 2). For this purpose, each test feature contained in the reduced subset that was determined in step S103 is visualized on the display by way of a corresponding graphical representation of the test feature.

By means of a further input command, the user can select a test feature visualized on the display 46 in order to adopt this test feature in the measurement plan and to store it therein. Preferably, this input command is effected once again by means of a Click & Pick command carried out by mouse.

In steps S103 and S104 as mentioned above, the software application installed in the control unit 42 ensures that when a measurement element is selected, not all the fundamentally possible test features for the selection thereof are presented to the user on the display 46. Instead, only a subset of the test features fundamentally possible for the selected measurement element is presented to the user on the display 46. The selection of the test features presented to the user on the display 46, which test features can then be adopted in the measurement plan by the user by means of Click & Pick, is effected depending on the view currently chosen on the display 46. For this purpose, the determination of the reduced subset of test features, as effected in step 103, involves determining what positions, spatial locations and/or sizes the respective graphical representations of the test features determined as fundamentally possible test features in step S102 would have in the view currently chosen on the display if the graphical representation were displayed on the display 46. The test features contained in the selection determined in step S102 are assigned to the reduced subset in step 103 only if the graphical representation of the test features satisfies at least one predefined criterion with regard to the position, the spatial location and/or the size in the view currently chosen on the display 46. This determination—performed in step S103—of the reduced subset of test features that are graphically visualized on the display 46 in step S104 is preferably effected dynamically. Accordingly, the reduced subset of the test features changes as soon as the view on the display 46 is altered by the user. To put it another way, upon selection of one and the same measurement elements, depending on the currently chosen view on the display 46, different test features are proposed to the user by way of their graphical visualization.

Figure 3:
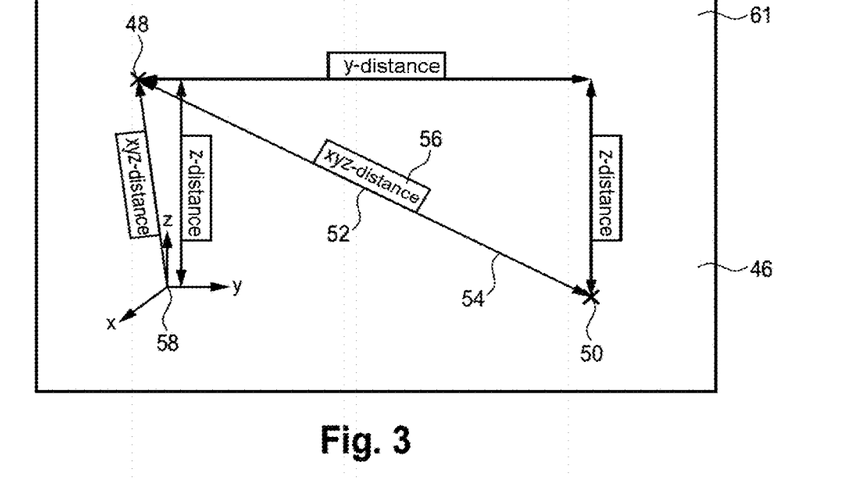
FIG. 3 is a first schematic illustration for elucidating principles of the present disclosure.

FIG. 3 shows a first example of such a graphically visualized proposal of test features from which the user can select one or more test features in order to adopt the latter in the measurement plan for the later measurement. Two points 48, 50 are illustrated therein as example measurement elements that were selected by the user in step S101. On the basis of the selection of these two points 48, 50, in step 102 the software application determined a selection of fundamentally possible test features that would be fundamentally conceivable upon selection of two points. Ultimately, however, only a subset of these test features is displayed to the user in the situation shown by way of example in FIG. 3. Here, for example, a first test feature is visualized on the display 46 on the basis of a graphical representation 52 comprising a dimension arrow 54 and a dimension text 56. This test feature is the spatial xyz-distance between the two points 48, 50. As further selectable test features, a y-distance and a z-distance are displayed graphically to the user on the display 46 in the example illustrated schematically in FIG. 3. The y-distance is a distance between the two points 48, 50 that is measured parallel to the y-axis, that is to say a projection of the spatial xyz-distance onto the y-coordinate axis. The z-distance is correspondingly the projection of the spatial xyz-distance onto the z-coordinate axis. Furthermore, the spatial xyz-distance between the origin of a coordinate system 58 and the first point 48 and the z-projection of this distance are also displayed to the user for selection.

In the case of the situation illustrated by way of example in FIG. 3, in which the user initially selects the two points 48, 50 as measurement elements (step S101), the software could in principle also display the x-distance, that is to say the projection of the spatial xyz-distance between the two points 48, 50 onto the x-axis. A graphical representation of this test feature would be hardly visible, however, in the view chosen in FIG. 3 since the graphical representation thereof (dimension arrow and dimension text) would be oriented perpendicularly to the image plane 61 (plane of the drawing) in the situation shown in FIG. 3.

For the purpose of clarity, accordingly, only the test features whose graphical representation in the view currently chosen on the display 46 exceeds a predefined angle in relation to a normal direction oriented orthogonally to the image plane 61 of the display 46 are displayed to the user. By way of example, only test features whose graphical representation (for example whose dimension arrows) exceed an angle of >30° with the normal direction oriented orthogonally to the image plane 61 are displayed. In the case shown schematically in FIG. 3, the plane of the drawing corresponds to the image plane 61 and the x-axis of the coordinate system 58 corresponds to the normal direction with respect to the image plane 61.

For the same reasons, in the case shown schematically in FIG. 3, for example, the x-distance between the point 48 and the origin of the coordinate system 58 is also not displayed to the user as a graphical selection possibility. The y-distance between the point 48 and the origin of the coordinate system 58 is also not displayed in the present case. The latter is not displayed to the user in the present case for example because the graphical representation of the y-distance between the point 48 and the origin of the coordinate system 58 would not exceed a minimum size in the view currently chosen on the display 46.

Figure 4:
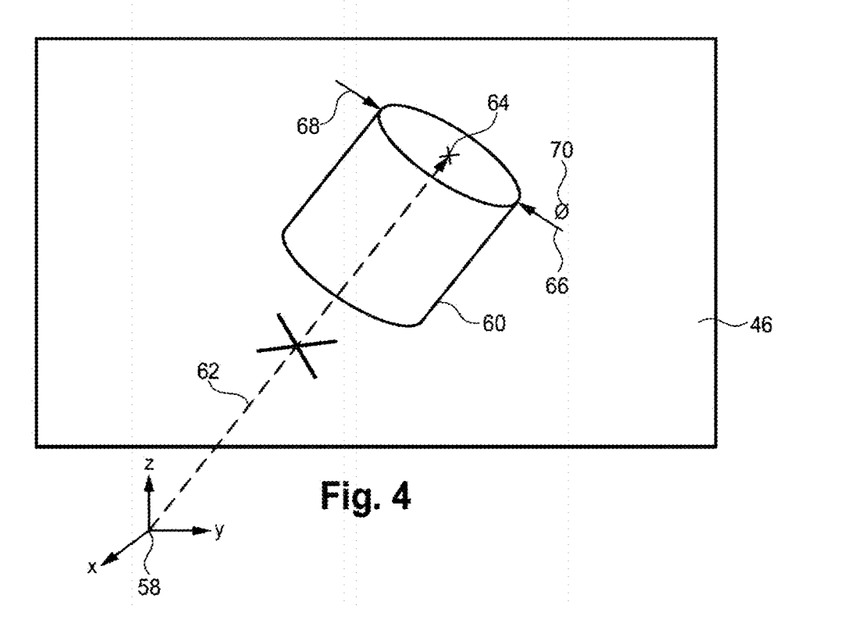
FIG. 4 is a second schematic illustration for elucidating principles of the present disclosure.

FIG. 4 shows a further example of possible test features that the software offers to the user for selection when a measurement element is selected. In the case shown in FIG. 4, the user selects a cylinder, for example, as measurement element 60 in step S101. The selection of fundamentally measurable test features that make sense when a cylinder is selected as measurement element is thereupon determined in step S102. This selection of fundamentally measurable test features can comprise, inter alia, the diameter of the cylinder and also the spatial distance 62 between a point 64 on the cylinder axis and the origin of a coordinate system 58.

In the example case illustrated schematically in FIG. 4, however, with the aid of a graphical representation 66 comprising not only a dimension arrow 68 but also a dimension symbol 70, only the diameter of the cylinder is graphically displayed to the user as a test feature that is selectable for the measurement plan. By contrast, in the situation shown in FIG. 4 the spatial distance 62 between the point 64 and the origin of the coordinate system 58 will not be adopted in the reduced subset of the test features that are represented graphically on the display 46. This is owing to the fact that the graphical representation of this distance is not completely representable in the view currently chosen on the display 46.

As a criterion for displaying a test feature, in the software it can accordingly be stipulated that a test feature is visualized graphically on the display 46 and is available to the user for selection only if the graphical representation of this test feature is completely representable in the view currently chosen on the display 46.

It goes without saying that diverse further criteria can be stored in the software, which are taken as a basis for determining the reduced subset of the test features that are ultimately visualized graphically on the display 46, depending on the view currently chosen on the display 46.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of A, at least one of B, and at least one of C."

What is claimed is:

1. A method for software-based planning of a dimensional measurement of an object, the method comprising:
   receiving an input command for selecting at least one measurement element of the object that is to be measured during the measurement;
   determining a selection of measurable test features of the at least one selected measurement element, wherein each of the selection of measurable test features comprises a dimensionally measurable measurand of the at least one selected measurement element;
   determining a reduced subset of the selection of measurable test features depending on a view currently chosen on a display; and
   visualizing the test features contained in the reduced subset by generating a graphical representation of each of the test features contained in the reduced subset on the display,
   wherein:
      determining the reduced subset of test features includes:
         determining which positions, spatial locations, or sizes the respective graphical representations of the test features contained in the selection would have in the view currently chosen on the display if the graphical representations were displayed on the display, and comparing the graphical representation of a test feature contained in the selection to at least one predefined criterion with regard to the position, the spatial location, or the size in the view currently chosen on the display, the test feature is assigned to the reduced subset only if the graphical representation of the test feature satisfies the at least one predefined criterion, and the at least one predefined criterion includes at least one of:
(i) a direction of the graphical representation of the respective test feature, in the view currently chosen on the display, exceeding a predefined angle in relation to a normal direction, wherein the normal direction is orientated orthogonally to an image plane of the display, and
(ii) the graphical representation of the respective test feature exceeding a predefined size in the view currently chosen on the display.

2. The method of claim 1, further comprising:
receiving a second input command for selecting a test feature visualized on the display; and
storing the selected test feature in a measurement plan, in which the test features to be measured during the dimensional measurement of the object are stored.

3. The method of claim 1, wherein the reduced subset of the test features is determined once more as soon as the view on the display is changed.

4. The method of claim 1, wherein the graphical representation of at least one test feature contained in the reduced subset comprises a dimensioning element having at least one of a dimension line, a dimension arrow, a dimension symbol, and a dimension text.

5. The method of claim 1, wherein the selection of measurable test features of the at least one selected measurement element is determined depending on a type of the at least one selected measurement element.

6. The method of claim 1, wherein the selection of measurable test features comprises at least one of:
a spatial distance between two points;
a spatial distance between two straight lines;
a spatial distance between two planes;
a spatial distance between a point and a straight line;
a spatial distance between a point and a plane;
a spatial distance between a straight line and a plane;
a spatial distance between a plane and an origin of a coordinate system;
a spatial distance between a straight line and the origin of the coordinate system;
a spatial distance between a point and the origin of the coordinate system;
a projection of a spatial distance onto a coordinate axis;
a spatial angle;
a projection of a spatial angle into a coordinate plane;
a parallelism of two straight lines;
a parallelism of two planes;
a perpendicularity of two straight lines;
a perpendicularity of two planes;
a shape deviation of a circle;
a shape deviation of a circle segment;
a shape deviation of a straight line;
a shape deviation of a rectangle;
a shape deviation of an elongated hole;
a shape deviation of a plane;
a diameter of a circle;
a diameter of a circle segment;
a radius of a circle;
a radius of a circle segment;
a curve length;
a curve shape;
a circularity of a circle;
a circularity of a circle segment;
a straightness of a straight line;
a planarity of a plane; and
a roughness of a surface.

7. The method of claim 1, wherein the view currently chosen on the display includes a view of a graphical representation of the object.

8. The method of claim 1, wherein determining the reduced subset of the selection of measurable test features depending on the view currently chosen on the display includes determining the reduced subset of the selection of measurable test features based on at least one of a perspective and a size of a graphical representation of the object that a user has chosen on the display.

9. A non-transitory computer-readable medium comprising program code configured to carry out a method when the program code is executed on a computer, the method comprising:
receiving an input command for selecting at least one measurement element of an object that is to be measured;
determining a selection of measurable test features of the at least one selected measurement element, wherein each of the selection of measurable test features comprises a dimensionally measurable measurand of the at least one selected measurement element;
determining a reduced subset of the selection of measurable test features depending on a view currently chosen on a display; and
visualizing the test features contained in the reduced subset by using a graphical representation of each of the test features contained in the reduced subset on the display, wherein:
determining the reduced subset of test features includes:
determining which positions, spatial locations, or sizes the respective graphical representations of the test features contained in the selection would have in the view currently chosen on the display if the graphical representations were displayed on the display, and
comparing the graphical representation of a test feature contained in the selection to at least one predefined criterion with regard to the position, the spatial location, or the size in the view currently chosen on the display,
the test feature is assigned to the reduced subset only if the graphical representation of the test feature satisfies the at least one predefined criterion, and
the at least one predefined criterion includes at least one of:
(i) a direction of the graphical representation of the respective test feature, in the view currently chosen on the display, exceeding a predefined angle in relation to a normal direction, wherein the normal direction is orientated orthogonally to an image plane of the display, and (ii) the graphical representation of the respective test feature exceeding a predefined size in the view currently chosen on the display.

10. A device for software-based planning of a dimensional measurement of an object, comprising:

a display; and a control unit connected to the display via a data connection, wherein:

the control unit is configured to:

receive an input command for selecting at least one measurement element of the object that is to be measured during the measurement;

determine a selection of measurable test features of the at least one selected measurement element, wherein each of the selection of measurable test features comprises a dimensionally measurable measurand of the at least one selected measurement element;

determine a reduced subset of the selection of measurable test features depending on a view currently chosen on the display; and visualize the test features contained in the reduced subset by generating a graphical representation of each of the test features contained in the reduced subset on the display, determining the reduced subset of test features includes:

determining which positions, spatial locations, or sizes the respective graphical representations of the test features contained in the selection would have in the view currently chosen on the display if the graphical representations were displayed on the display, and comparing the graphical representation of a test feature contained in the selection to at least one predefined criterion with regard to the position, the spatial location, or the size in the view currently chosen on the display, the test feature is assigned to the reduced subset only if the graphical representation of the test feature satisfies the at least one predefined criterion, and the at least one predefined criterion includes at least one of:

(i) a direction of the graphical representation of the respective test feature, in the view currently chosen on the display, exceeding a predefined angle in relation to a normal direction, wherein the normal direction is orientated orthogonally to an image plane of the display, and (ii) the graphical representation of the respective test feature exceeding a predefined size in the view currently chosen on the display.

* * * * *